(12) United States Patent
Massen

(10) Patent No.: US 7,446,884 B2
(45) Date of Patent: Nov. 4, 2008

(54) METHOD FOR OPTICALLY DETECTING THE SPATIAL FORM OF INSIDE SPACES AND A DEVICE FOR CARRYING OUT SAID METHOD

(75) Inventor: Robert Massen, Ohningen-Wangen (DE)

(73) Assignee: corpus.e AG, Stuttgart (DE)

( * ) Notice: Subject to any disclaimer, the term of this patent is extended or adjusted under 35 U.S.C. 154(b) by 335 days.

(21) Appl. No.: 10/510,935

(22) PCT Filed: Apr. 8, 2003

(86) PCT No.: PCT/EP03/03636

§ 371 (c)(1),
(2), (4) Date: Apr. 1, 2005

(87) PCT Pub. No.: WO03/087715

PCT Pub. Date: Oct. 23, 2003

(65) Prior Publication Data

US 2005/0168756 A1    Aug. 4, 2005

(30) Foreign Application Priority Data

Apr. 12, 2002   (DE) ................ 102 16 475

(51) Int. Cl.
*G01B 11/24* (2006.01)
*G02B 26/10* (2006.01)

(52) U.S. Cl. .................. 356/601; 356/620; 356/5.15; 250/334

(58) Field of Classification Search ......... 356/601–625, 356/5.15, 4.01; 250/334; 600/587; 382/154, 382/142
See application file for complete search history.

(56) References Cited

U.S. PATENT DOCUMENTS

| | | | | |
|---|---|---|---|---|
| 4,025,192 A | * | 5/1977 | Scholdstrom et al. | 356/4.01 |
| 4,172,661 A | * | 10/1979 | Marcus et al. | 356/4.01 |
| 4,508,448 A | * | 4/1985 | Scholdstrom et al. | 356/5.15 |
| 4,893,933 A | * | 1/1990 | Neiheisel et al. | 356/608 |
| 5,125,745 A | * | 6/1992 | Neiheisel et al. | 356/602 |
| 5,392,715 A | * | 2/1995 | Pelrine | 104/138.2 |
| 5,706,090 A | * | 1/1998 | Jokinen | 356/620 |
| 5,851,115 A | | 12/1998 | Carlsson et al. | |
| 5,911,126 A | | 6/1999 | Massen | |
| 5,911,694 A | * | 6/1999 | Ikeda et al. | 600/587 |
| 6,852,975 B2 | * | 2/2005 | Riegl et al. | 250/334 |
| 6,922,251 B1 | * | 7/2005 | Kirchhoff et al. | 356/601 |
| 2003/0137510 A1 | | 7/2003 | Massen | |

FOREIGN PATENT DOCUMENTS

| | | |
|---|---|---|
| EP | 0 507 709 A1 | 10/1992 |
| EP | 0 760 622 B | 3/1997 |
| WO | WO 02074038 | 9/2002 |

* cited by examiner

*Primary Examiner*—Sang Nguyen
(74) *Attorney, Agent, or Firm*—Stuart J. Friedman

(57) ABSTRACT

A cost-effective method for detecting the three-dimensional shape of interior spaces such as footwear, prosthesis funnels, etc. is described. For this purpose the inner wall of the interior space is lined with a formfitting, elastic and photogrammetrically marked envelope (2), a series of overlapping recordings of said interior space marked in this way is produced with the aid of one or more imaging devices (4) and from this the 3D-shape of the interior space is determined using photogrammetrical methods. The invention describes various methods of lining the interior space, of guiding the imaging devices (9) into the different recording positions and of the type of the measurable interior spaces.

13 Claims, 4 Drawing Sheets

METHOD FOR OPTICALLY DETECTING THE SPATIAL FORM OF INSIDE SPACES AND A DEVICE FOR CARRYING OUT SAID METHOD

FIELD OF THE INVENTION

The invention relates to a method of optically detecting the three-dimensional shape of interior spaces and an arrangement for performing the method.

BACKGROUND OF THE INVENTION

Regarding the production of products that are adapted to fit the human body, such as clothing, footwear, orthopedic articles, e.g. orthoses and prostheses, it is often required to detect the three-dimensional shape of this body or body part. Various optical scanning methods are known for this purpose, ranging from complex laser triangulation methods to stripe projection systems. In particular a cost-effective photogrammetrical method is known in which the body part to be digitized is covered with a marked elastic envelope, recorded with one or more 2D-cameras from different recording positions overlapping each other, and a 3D-model of this body part is determined by an automatic photogrammetrical evaluation of these views (Robert Massen: Verfahren und Anordnung zur Erfassung der Raumform von Körpern und Körperteilen, EP 0,760,622).

When products which are intended to be in snug contact with the body, e.g. shoes, gloves, prosthesis stumps and the like are produced, the three-dimensional shape of the product does not directly correspond to the three-dimensional shape of the body part. For example the last required for producing a custom-made shoe is substantially narrower than the corresponding foot, as the shoe produced with the aid of the last must somehow compress and form the foot to some extent, in order to produce a good fit.

This difference between the three-dimensional shape of the last and the three-dimensional shape of the foot cannot yet be calculated analytically today. Similarly complicated conditions also apply to custom-made prosthesis funnels for receiving the limb stump. Thus, these custom-made articles produced with the aid of 3D-scan data of the body part often still require complex repeated finishing operations in order to finally obtain the fitting three-dimensional shape.

On the other hand such fitting products are often already available, e.g. an already worn-in and well fitting shoe, glove, prosthesis part, etc. If the three-dimensional shape of this product were known, the producer would have those 3D-data on hand which are required for producing a product that would fit immediately. Unfortunately there have not been any functioning and cost-effective methods for an optical 3D-detection of the interior space of such often cover-shaped products up to now. Indeed it is known to digitize interior spaces with 3D-endoscopes using methods of stereo technology or stripe projection; these methods, however, are complex and require the object to be digitized and the endoscopic systems to be clamped tight, in order to be able to combine the individual 3D-views into a complete model. This clamping as well as the requirement of having to know in each case the exact 3-dimensional recording position of the endoscopic system in relation to the interior space makes the application of these methods more expensive and significantly more complex and thus puts them beyond the options of a specialized orthopedics dealer or shoe store.

Thus, there is a need for a cost-effective and simple system for detecting the three-dimensional shape of interior spaces of products, especially of such products that are adapted to fit the shape of a body part.

SUMMARY OF THE INVENTION

In the method according to the invention the interior space to be detected is lined, in a first step, with a thin envelope in snug contact with the interior three-dimensional shape and provided with marks facing the interior space and adapted to be evaluated photogrammetrically. In a second step, one or more imaging devices that are inserted into the interior space are used to produce a number of overlapping 2D-recordings of the marked envelope. Then in a third step, the 3D-shape of the interior space is determined from these recordings using photogrammetrical methods.

This method is described as an example in the detection of the inner three-dimensional shape of footwear within the scope of producing well-fitting shoes. This description is to be considered as an example and does not restrict the application of the inventive idea with regard to the detection of the three-dimensional shape of other interior spaces, including those of a technical nature, in any way.

An arrangement for performing the method is indicated in the claims.

BRIEF DESCRIPTION OF THE DRAWINGS

Further features and advantages of the invention will become apparent from the following description with reference to the appending drawings, in which.

DESCRIPTION OF THE PREFERRED EMBODIMENTS

Figure 1:
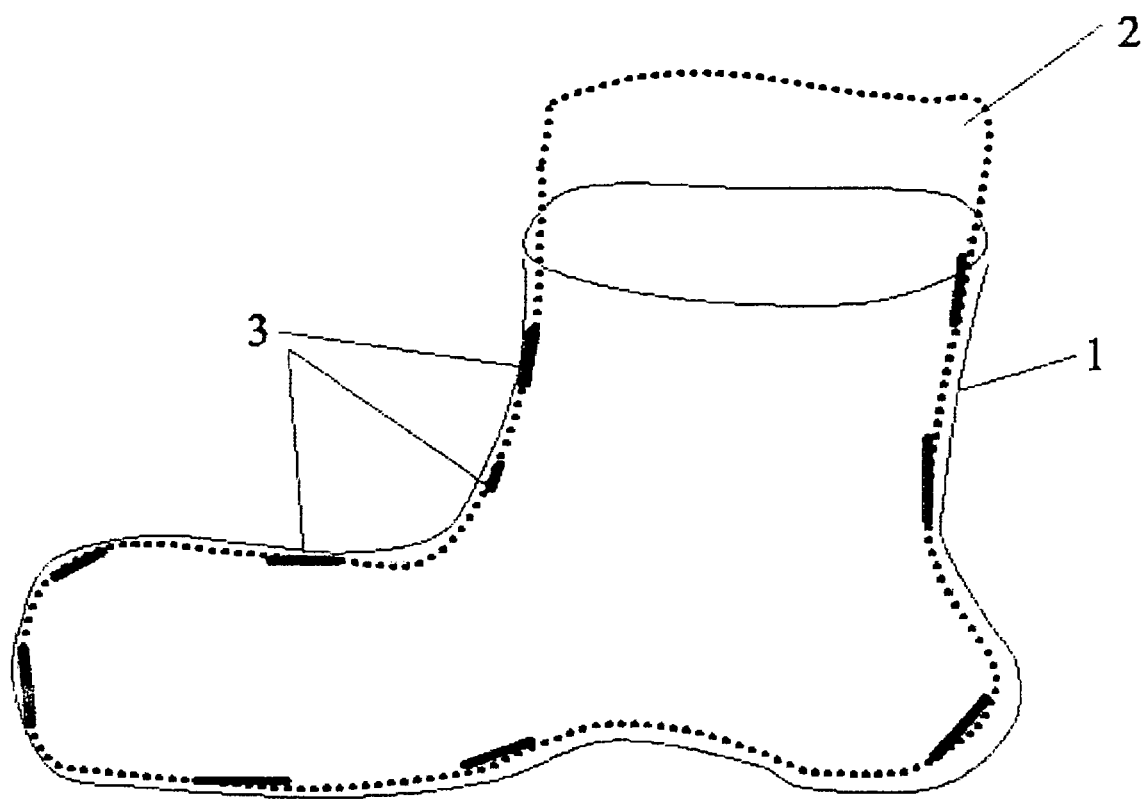
FIG. 1 is a diagrammatic illustration of the interior space of a shoe with an inner lining by a thin elastic envelope provided with marks adapted to be evaluated photogrammetrically.

FIG. 1 shows in an exemplary way how the interior space of a shoe 1 is lined with a thin formfitting envelope 2, whose surface facing the interior space is provided with marks 3 that are adapted to be evaluated photogrammetrically. For example this can be performed by turning an elastic marked sock in such a fashion that the marking faces the inside. A light spray adhesive is sprayed onto the outside of the turned sock. Then the sock is moved into the interior of the shoe e.g. using an inflatable balloon or an inflatable cover and pushed against the inside of the shoe by the inflated balloon where it is fixed onto the inner wall with the aid of the adhesive. Then the balloon is deflated and removed. Now the interior of the shoe is lined with a thin skin which is provided with marks 3 adapted to be evaluated photogrammetrically.

The marked sock can also be inserted into the interior of the shoe by dressing the foot of the shoe's owner with the turned sock, applying a spray adhesive from the outside and then putting the shoe on. As soon as the spray adhesive adheres, the naked foot is pulled out of the sock/shoe. If required the foot can first be provided with a lubricant in order to make it easier to pull it out of the sock. These are only two exemplary concepts for lining an interior space with a thin, photogrammetrically marked cover.

Figure 2:
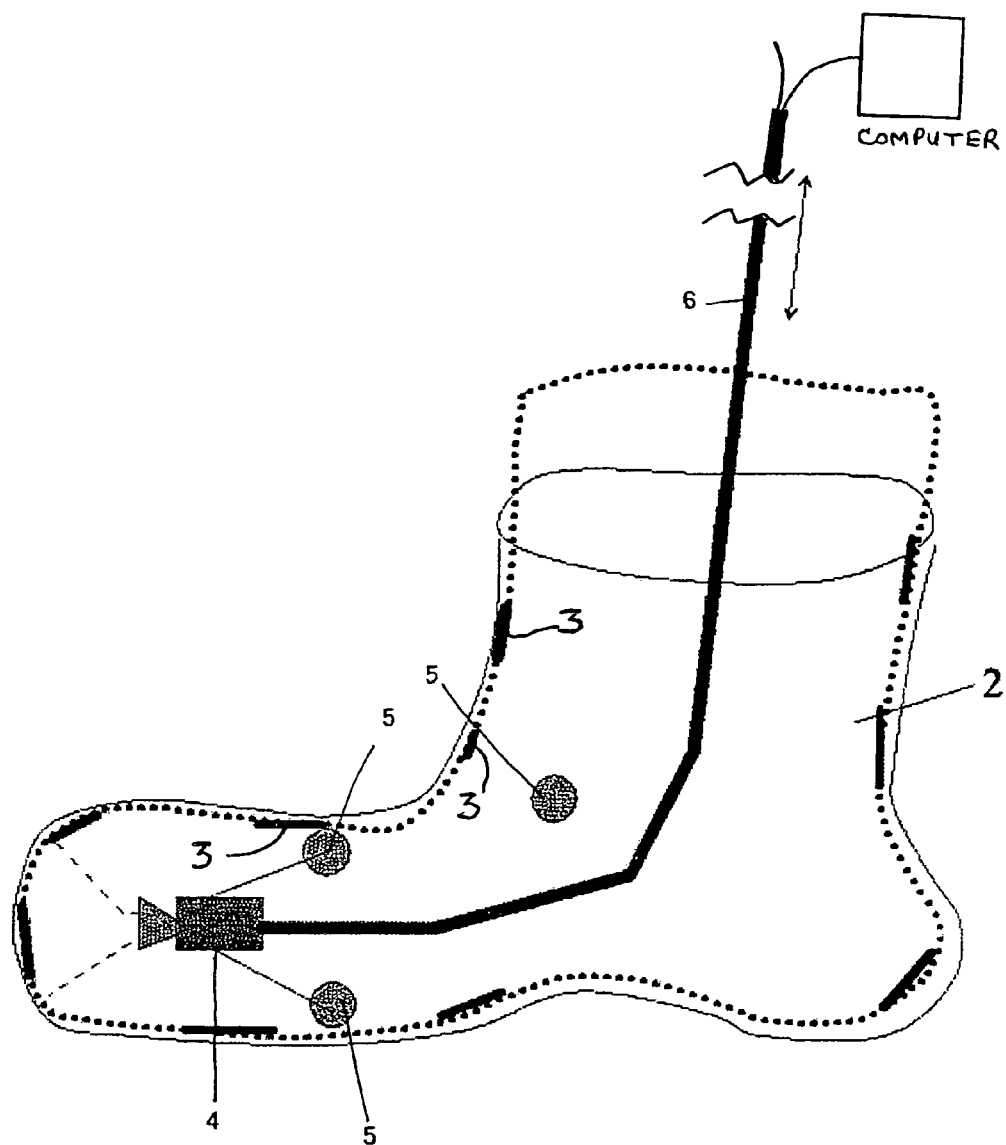
FIG. 2 shows the insertion of the imaging device into the interior space of the shoe.

FIG. 2 illustrates the second step of the method. A miniature camera 4 is inserted into the lined shoe 1, and a number of overlapping images is produced from any spatial positions, the images covering the complete or only the interesting part of the interior space. In this context, the exact spatial position and orientation of the camera do not have to be known. In an advantageous embodiment of the invention the miniature camera is guided roughly centrically by a number of spring-mounted spacers 5, which are configured as rolls here, and pulled out manually from the recording position in the toe of the shoe to the leg of the shoe using a flexible cable 6 while overlapping recordings of the inner wall are produced.

The camera can be tilted and turned automatically or manually via control elements running through the guiding cable such that overlapping recordings of the interior space are produced.

Figure 3:
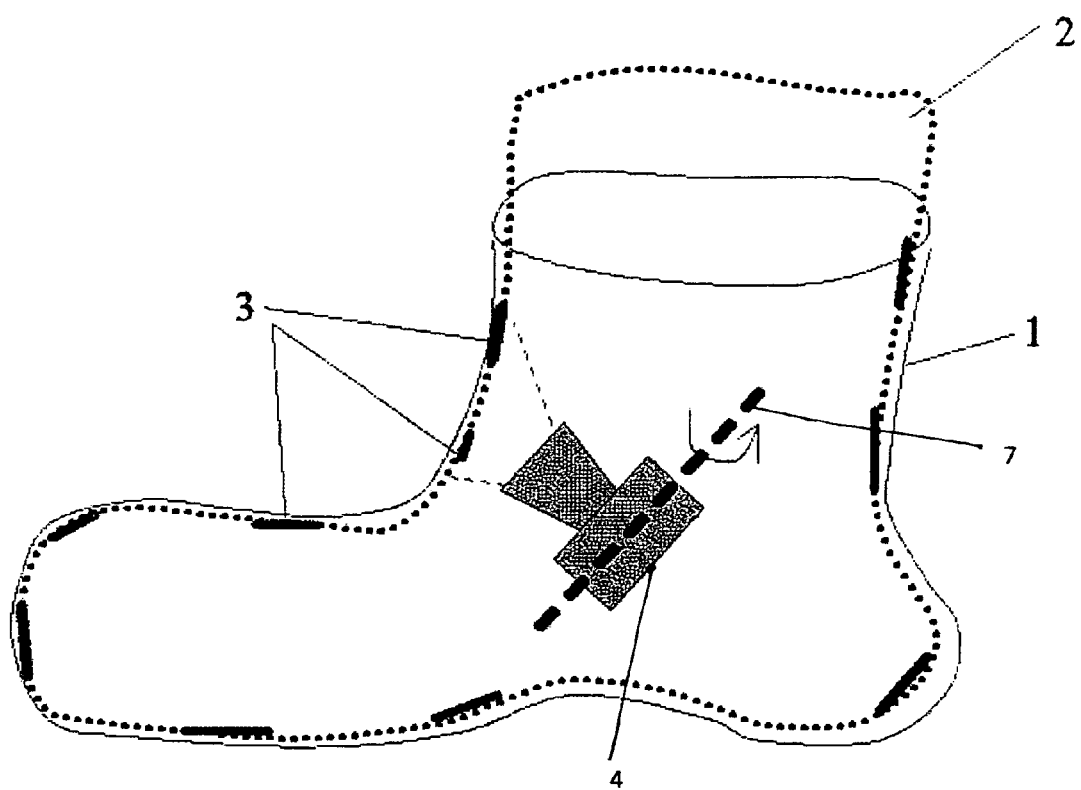
FIG. 3 shows the movement of the imaging device in the interior space of the shoe.

A further inventive idea, which is illustrated in FIG. 3, is that the tilted camera 4 rotates around an axis 7 during this, such that continuous panoramic views in bands of the interior space are produced continuously, these views overlapping both radially and axially.

It is a further inventive idea that the camera is a video camera which continuously produces image sequences from overlapping single views.

Figure 4:
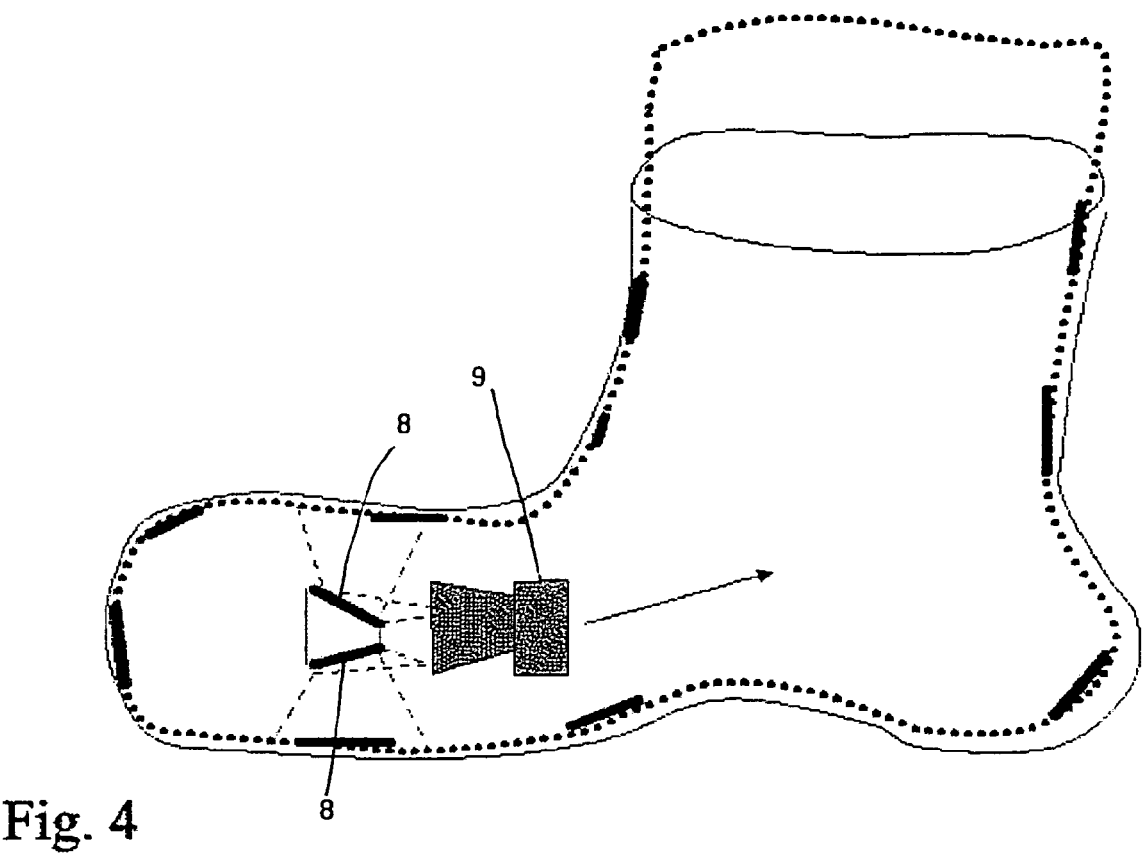
FIG. 4 shows a particular embodiment of an imaging device that has been inserted into the interior space of the shoe.

In accordance with the invention the panoramic view of the interior space according to FIG. 4 can also be achieved if the interior space is represented on the image sensor 9 in a radial band via a collar-shaped mirror 8 and if the unit collar-shaped mirror 8-image 9 is moved axially after each recording in such a fashion that these panoramic recordings overlap axially.

Of course, the imaging device can also be outside of the interior space. In this case the recordings of the interior space are transmitted to the camera via an endoscopic system of optical fibers, bar lenses or mirrors.

In the third step the 3D-shape of the interior space is calculated on the basis of the sequence of the images of the marked interior space with the aid of photogrammetrical methods. Such methods can be performed automatically, e.g., by a computer, and are described, e.g., in the following patents:

Robert Massen, Verfahren und Anordnung zur photogrammetrischen Erfassung der Raumform eines Objekts, PCT/EP01/05935;

Robert Massen, Verfahren und Anordnung zur photogrammetrischen Erfassung der Raumform eines Objekts, PCT/EP02/02875.

The method according to the invention applies to all interior spaces that can be lined with a formfitting envelope that is marked to be evaluated photogrammetrically. These can also be orifices of the body such as the auditory canal, in order to obtain the 3D-shape for producing a hearing aid.

The inventive idea is not limited to biological bodies, but can also be applied to technical interior spaces that can be marked correspondingly.

The invention claimed is:

1. A method of optically detecting the three-dimensional shape of an interior space defined by an inner wall of a product adapted to fit the shape of a body part, comprising the steps of:
   providing said interior space with an elastic envelope in snug contact with the inner wall, said elastic envelope being provided with marks facing the inside of the space and adapted to be evaluated photogrammetrically;
   producing a number of overlapping image recordings of said interior space marked in this way with the aid of one or more 2D-cameras; and,
   photogrammetrically evaluating said recordings for determining the three-dimensional shape of that part of said interior space that was detected by said overlapping recordings.

2. The method according to claim 1, wherein the side of the marked envelope facing the inner wall is provided with a means adhering to said inner wall prior to insertion into the interior space.

3. The method according to claim 2, wherein an inflatable cover is inserted into the marked envelope, said envelope is placed into the interior space with said cover and there said envelope is pressed against the inner wall of the interior space to be detected by admitting internal pressure into said cover such that it is in snug contact with said inner wall, and in that afterwards said cover is relieved from pressure and removed, in order to make room for the insertion of one or more imaging devices.

4. The method according to any of claims 1 to 3, wherein the interior space constitutes the interior of a product which is in contact with the human body during use.

5. The method according to claim 4, wherein the interior space is the interior of footwear.

6. The method according to claim 4, wherein the interior space is the interior of a prosthesis funnel for receiving a limb stump.

7. The method according to any of claims 1 to 3, wherein the interior space is the interior of an orifice of the body.

8. The method according to any of claims 1 to 3, wherein a video camera is used as imaging device and that the overlapping image recordings of the interior space are recorded in the form of one or more video sequences.

9. The method according to any of claims 1 to 3, wherein the imaging device(s) is/are rotated axially and successively record(s) both axially and radially overlapping recordings of the marked interior space.

10. The method according to any of claims 1 to 3, wherein the imaging device(s) inside the interior space is/are put into the different overlapping recording positions.

11. The method according to any of claims 1 to 3, wherein the interior space is mapped on the imaging device in radial bands via a collar-shaped mirror.

12. The method according to any of claims 1 to 3, wherein the imaging device(s) is/are guided in the interior space by spacers.

13. The method according to any of claims 1 to 3, wherein the overlapping image fields are transmitted from the interior space to one or more imaging device(s) located outside the interior space via an endoscopic system.

* * * * *